US012797753B2

(12) United States Patent
Sannino et al.

(10) Patent No.: US 12,797,753 B2
(45) Date of Patent: Nov. 17, 2026

(54) GAME VIEWER REACTIONS TO TRIGGER IN-GAME POWER-UPS

(71) Applicant: Sony Interactive Entertainment Inc., Tokyo (JP)

(72) Inventors: Emil Sannino, San Mateo, CA (US); Shogo Suzuki, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 295 days.

(21) Appl. No.: 18/475,148

(22) Filed: Sep. 26, 2023

(65) Prior Publication Data

US 2025/0099860 A1 Mar. 27, 2025

(51) Int. Cl.

*A63F 13/86* (2014.01)
*A63F 13/58* (2014.01)
*A63F 13/69* (2014.01)

(52) U.S. Cl.

CPC .............. *A63F 13/86* (2014.09); *A63F 13/58* (2014.09); *A63F 13/69* (2014.09)

(58) Field of Classification Search

CPC .......... A63F 13/86; A63F 13/58; A63F 13/69; A63F 13/87

See application file for complete search history.

(56) References Cited

U.S. PATENT DOCUMENTS

| | | | |
|---|---|---|---|
| 2019/0108578 A1 | 4/2019 | Spivack et al. |
| 2019/0192974 A1 | 6/2019 | Eatedali et al. |
| 2023/0381674 A1 | 11/2023 | Singh et al. |

OTHER PUBLICATIONS

Dead Cells Wiki, "Streamer Mode," May 21, 2023, https://web.archive.org/web/20230521004904/https://deadcells.wiki.gg/wiki/Streamer_Mode (Year: 2023).*
Twitch, "Emotes," Jun. 13, 2021, https://web.archive.org/web/20210613115848/https://basic-guide-to-twitchtv.pagecloud.com/chatfundamentals (Year: 2021).*
Vermintide 2 Wiki, "Twitch Mode," Apr. 10, 2021, https://web.archive.org/web/20210410120422/https://vermintide2.fandom.com/wiki/Twitch_Mode (Year: 2021).*
Hatedread, How do you 'timestamp' your games' packets?, Aug. 13, 2014, https://www.reddit.com/r/gamedev/comments/2df7xo/how_do_you_timestamp_your_games_packets/ (Year: 2014).*
Evaisa, Twitch Lib, https://web.archive.org/web/20220604054606/https://steamcommunity.com/sharedfiles/filedetails/?id=2441933370, Jun. 4, 2022 (Year: 2022).*
Marino, "Power Up", Available online at: https://www.giantbomb.com/power-up/3015-700/, Oct. 31, 2021, 8 pages.

(Continued)

*Primary Examiner* — Kevin Y Kim
(74) *Attorney, Agent, or Firm* — Kilpatrick Townsend Stockton LLP

(57) ABSTRACT

Viewers of a computer game can send reactions such as graphic-based reactions to another person playing the computer game. The reactions are then used to trigger in-game power-ups such as health power-ups and character ability power-ups. In some examples, meeting certain criteria for the reactions may trigger the power-up, such as a threshold number of reactions being received within a threshold period of time and/or a particular sequence of different reactions being received.

19 Claims, 9 Drawing Sheets

(56) References Cited

OTHER PUBLICATIONS

PCT/US2024/045185, "International Search Report and Written Opinion", Jan. 10, 2025, 8 pages.
Strom, "'Never Stop Sneakin' is a Brilliant Send-Up of '90s Stealth Games'", Available online at: https://arstechnica.com/gaming/2018/07/never-stop-sneakin-captures-metal-gear-solid-nostalgia-in-the-right-way/, Jul. 13, 2018, 10 pages.

* cited by examiner

GAME VIEWER REACTIONS TO TRIGGER IN-GAME POWER-UPS

FIELD

The disclosure below relates generally to in-game power-ups that are triggered based on viewer reactions to computer gameplay.

BACKGROUND

As understood herein, some video gamers stream their gameplay to others so that the other people can watch their gameplay. As also recognized herein, current systems are technologically limited in their ability to provide adequate viewer participation, which present principles recognize may provide for a more robust and engaging viewing experience from a technological perspective.

SUMMARY

Accordingly, present principles are directed to enhancing the overall execution environment of the game itself as well as providing enriched technology-based interactivity features, modifying execution of the game based on viewer reactions to gameplay.

As such, in one aspect an apparatus includes a processor assembly programmed with instructions to execute a computer game in which a first person plays the computer game. The processor assembly is also programmed to receive input from a second person that is viewing a livestream of the computer game but that is not controlling a character of the computer game. The input includes a graphic-based reaction. The processor assembly is further programed to trigger an in-game power-up based on the input.

In some specific examples, the graphic-based reaction may include a graphic-based sentiment reaction such as an emoji and/or an emote.

In some example implementations, the processor assembly may be configured to trigger a first in-game power-up based on the graphic-based reaction being a reaction of a first reaction type, and to trigger a second in-game power-up based on the graphic-based reaction being a reaction of a second reaction type. The second reaction type may be different from the first reaction type, and the second in-game power-up may be different from the first in-game power-up.

Also in some example implementations, the processor assembly may be configured to receive respective inputs from different people that are viewing the livestream, where the respective inputs may each include a graphic-based reaction. Here the processor assembly may then trigger the in-game power-up based on the respective inputs being received within a threshold period of time. In certain specific examples, the threshold period of time may begin based on a game action and may be less than an entire amount of time to play a particular level or scene of the computer game.

Still further, if desired the processor assembly may also be configured to receive plural inputs each of which comprises a graphic-based reaction and to trigger the in-game power-up based on the plural inputs being received within a threshold period of time (e.g., regardless of if the inputs are received from the same person or different people).

Also in certain examples, the processor assembly may be configured to receive plural inputs each of which may include a graphic-based reaction and to trigger the in-game power-up based on the plural inputs establishing a threshold number of inputs greater than one.

As another example, the processor assembly may be configured to receive a particular sequence of inputs of different graphic-based reactions and to trigger the in-game power-up based on the particular sequence of inputs. In certain specific examples, the particular sequence may be a first particular sequence, the in-game power-up may be a first in-game power-up, and the processor assembly may be configured to receive a second particular sequence of inputs of different graphic-based reactions. The second particular sequence may be different from the first particular sequence. Here the processor assembly may also be configured to trigger a second in-game power-up different from the first in-game power-up based on the second particular sequence.

In various examples, the in-game power up may decay over time regardless of gameplay.

As examples, the in-game power-up may include a character health power-up, a character ability power-up, an added character life, and/or a player inventory power-up.

In another aspect, a method includes executing a computer game in which a first person plays the computer game and receiving input from a second person that is viewing a livestream of the computer game. The input includes a reaction to gameplay of the computer game. The method also includes triggering an in-game power-up based on the input.

In one particular example, the method may include triggering a first in-game power-up based on the reaction being a reaction of a first reaction type, and triggering a second in-game power-up based on the reaction being a reaction of a second reaction type. The second reaction type may be different from the first reaction type, and the second in-game power-up may be different from the first in-game power-up.

Additionally or alternatively, in some examples the method may include receiving plural inputs each of which may include a reaction and triggering the in-game power-up based on the plural inputs being received within a threshold period of time.

Still further, in some examples the method may include receiving a particular sequence of inputs of different reactions and triggering the in-game power-up based on the particular sequence of inputs.

In still another aspect, a system includes at least one computer storage that is not a transitory signal. The storage includes instructions executable by at least one processor to receive input from a first person spectating gameplay of a computer game, where the input includes a reaction. The instructions are also executable to, based on the input, trigger an in-game power-up for a character of the computer game that is being controlled by a second person and/or trigger an in-game power-down for the character. The second person is different from the first person.

The details of the present application, both as to its structure and operation, can be best understood in reference to the accompanying drawings, in which like reference numerals refer to like parts, and in which:

DETAILED DESCRIPTION

Figure 1:
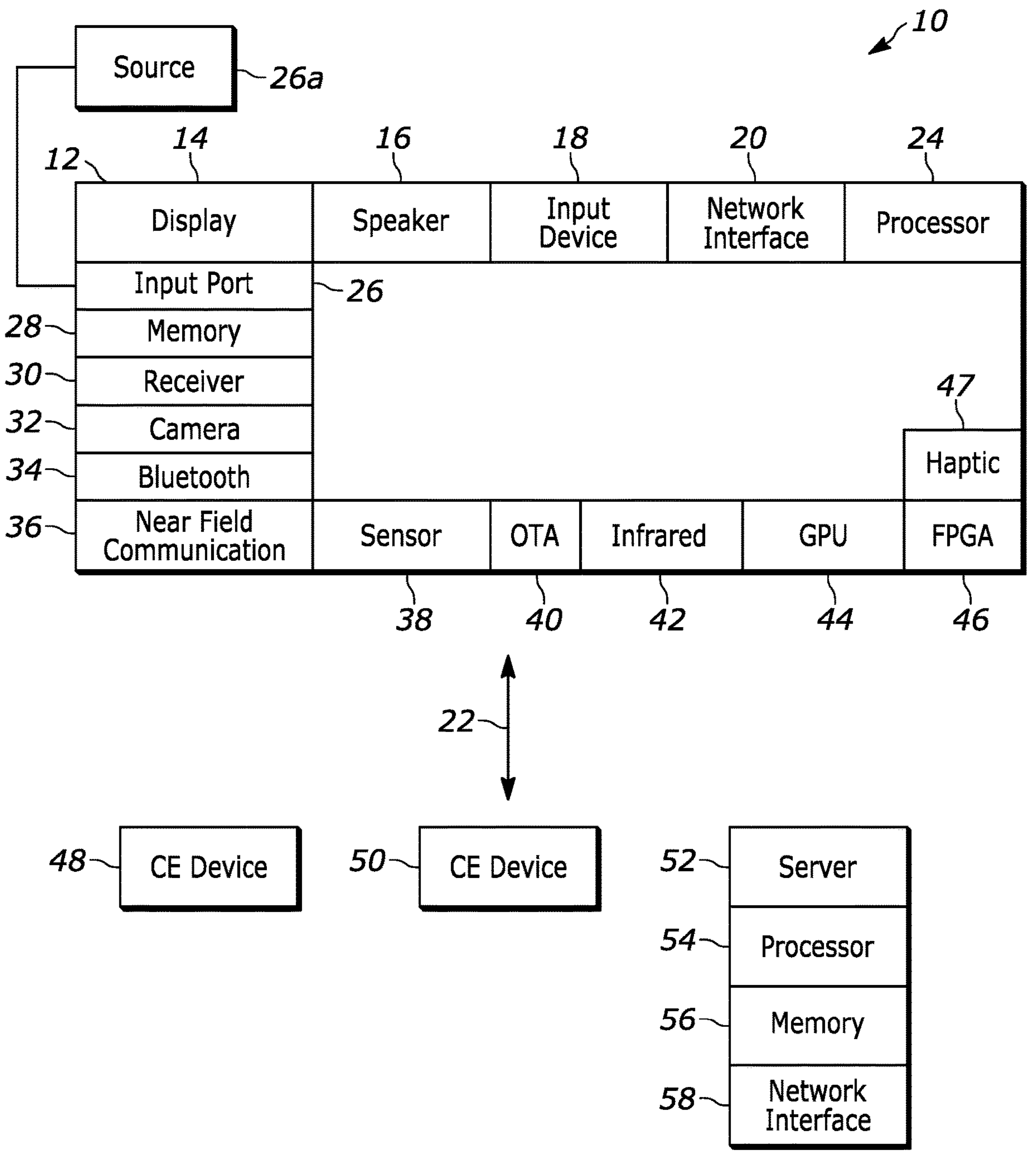
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation©, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implements methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Present principles may employ machine learning models, including deep learning models. Machine learning models use various algorithms trained in ways that include supervised learning, unsupervised learning, semi-supervised learning, reinforcement learning, feature learning, self learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that are configured and weighted to make inferences about an appropriate output.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

With the foregoing in mind, present principles recognize that screen sharing of computer/video games may allow gainers and viewers to share any game moment and content with each other. Aspects below may be combined with game streaming services where the flows of communication may be more one-to-many, and the viewers need not necessarily even be friends of the gamer but unacquainted viewers.

These aspects along with others discussed below may help enhance the social game play experience and the technological capabilities of computer-based gaming systems in particular.

Thus, according to the disclosure below, share screen functionality may fill the gamer's desire to easily and directly share real time gaming moments with friends and others to enjoy the moments together. Gainers may therefore casually stream their gameplay to friends and small groups in real time, while chatting and playing together in parties and other scenarios, creating a sense of togetherness despite the distributed and sometimes detached nature of computer-based gaming in particular. Present principles may be employed on video game consoles, on mobile applications executable at smartphones and other mobile devices, and on other types of devices including laptop and desktop computers.

Figure 2:
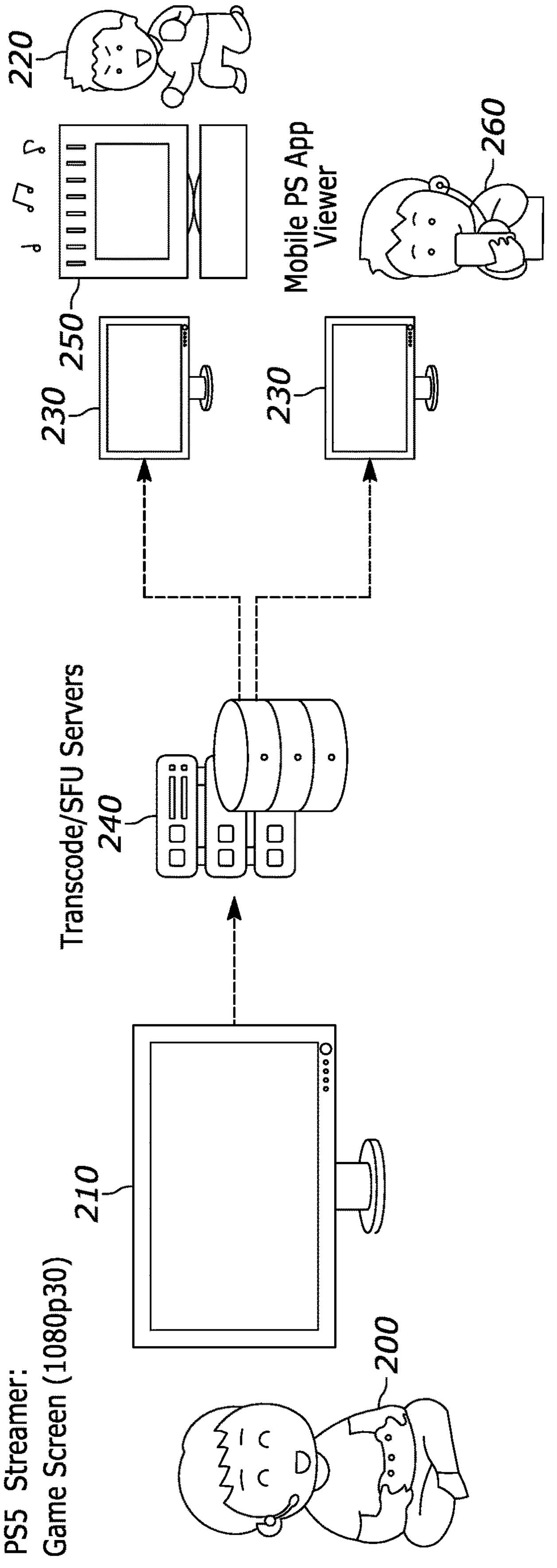
FIG. 2 shows a schematic diagram of a streamer playing a video game and streaming the gameplay to viewers that are using different types of devices to view the gameplay consistent with present principles.

With the foregoing in mind, reference is made to FIG. 2. This figure shows a PlayStation 5 gamer/steamer 200 playing a computer game whose visual content is presented on a local television display 210 in 1080p definition at a thirty frames-per-second (fps) frame rate. The gamer/streamer 200 is also steaming his/her gameplay to a remotely-located viewer 220 that is observing audio and video (A/V) content 230 of the gameplay on another television 250 once the A/V content stream is routed through one or more transcode/selective forwarding unit (SFU) servers 240 and then received by a local game console wired to the local television 250 in the personal residence of the viewer 220. The gameplay is also being streamed to a mobile application viewer 260, where the A/V content 230 is being observed on a smartphone once the A/V content stream is routed through the server(s) 240 and then received by a dedicated mobile application of a gaming console manufacturer that is executing at the smartphone. FIG. 2 thus demonstrates the different types of devices and systems that may be used to view the A/V content stream 230 of the gameplay.

Figure 3A:
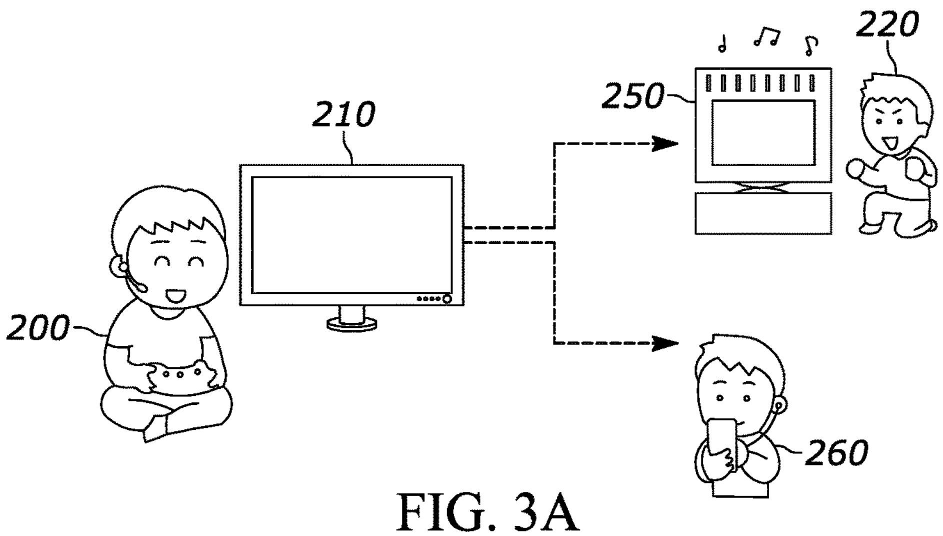
FIGS. 3A-3C show schematics of different types of streamer/viewer interactions that might take place consistent with present principles.
Figure 3B:
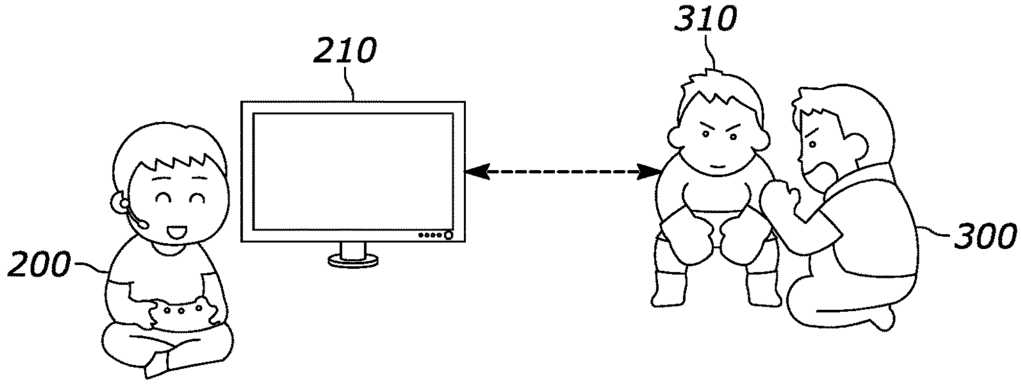
Figure 3C:
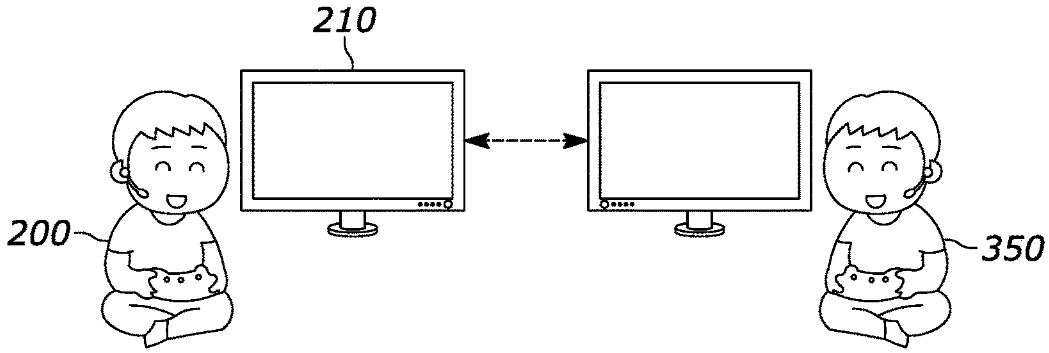

FIGS. 3A-3C further illustrate present principles. FIG. 3A illustrates that the gamer 200 may stream the gameplay through the server(s) 240 to one or more friends 220, 260 so those two viewers can watch along and enjoy the game together with the gamer 200 and each other.

FIG. 3B illustrates that the gamer/streamer 200 may stream the gameplay through the server(s) 240 to a friend 300 so that the friend 300 can help or coach the gamer 200 and, if the friend 300 is also playing the same game instance, so that the gamer 200 can also help or coach the viewer 300. Thus, it is to be understood that audio of the gamer 200 speaking as detected by a local microphone proximate to the gamer 200 may be streamed to the viewer 300, and vice versa. This might be accomplished through a separate, dedicated out-of-band audio channel or as part of the bi-directional game stream itself. Also note per FIG. 3B that the person 310 that is shown in FIG. 3B is a visual illustration of the gamer 200 to demonstrate the coaching that might occur (even though the gamer 200 and viewer 300 are remotely-located from each other at different geographic locations).

Turning to FIG. 3C, this figure demonstrates that streaming of the gameplay of the gamer/streamer 200 to a friend 350 may be used so that the gamer 200 and friend 350 may see each others' point of view (POV) while playing a multiplayer game (the POV of the opposing player as opposed to the relevant player's own point of view for his/her game character).

Figure 4:
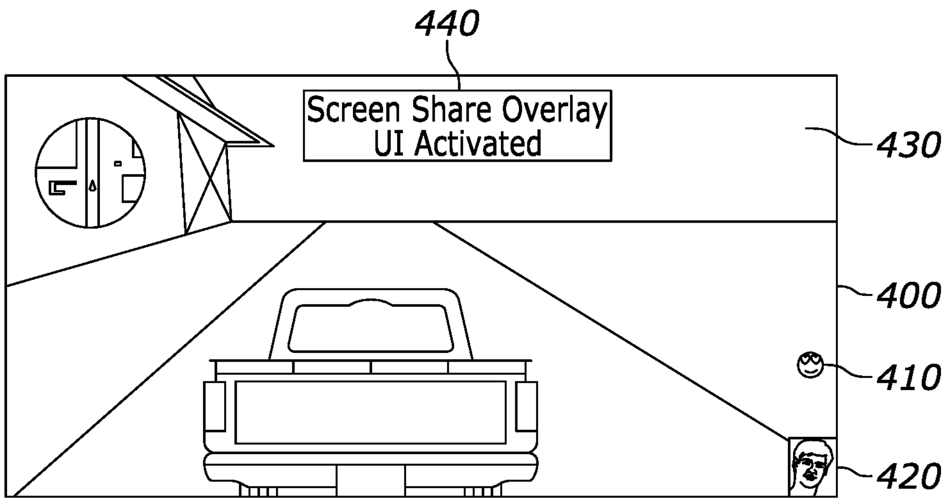
FIG. 4 shows a first example graphical user interface (GUI) overlaid on the point of view (POV) of a streamer as the streamer plays a computer game, where a certain viewer has provided a sentiment-based non-text graphical reaction that is presented to the streamer consistent with present principles.

Turning to FIG. 4, it is recognized herein that the share screen experience can be expanded even further with unique interactive functionalities to drive viewer engagement and general share screen usage along with improving the execution environment of the computer game itself. These functionalities include reaction features. Specifically, FIG. 4 shows an example where a reaction by a viewer named Alex is demonstrated via a smiling face with heart-shaped eyes emoji 410, which might have been provided by Alex and presented on the streamer's display as shown to demonstrate that Alex loves what he is watching from the streamer as the streamer plays the computer game. An avatar or profile picture 420 of Alex is also shown so that the streamer can discern from whom the emoji 410 was provided. Note that the elements 410, 420 may be presented using a graphical user interface (GUI) 430 that is overlaid on the gamer/streamer's point of view (POV) as the game is played out on the display 400 of the steamer.

Additionally, other reaction elements discussed herein, including emotes and other emojis, may also be presented using the same GUI 430 as overlaid on any given computer game's video content. Also note for completeness that a text indication 440 may be presented as part of the GUI 430 and may indicate that the streamer's game video is being streamed to others and that the GUI 430 has been activated so that the other people (viewers) can send reactions to trigger power-ups or power-downs consistent with present principles.

Figure 5:
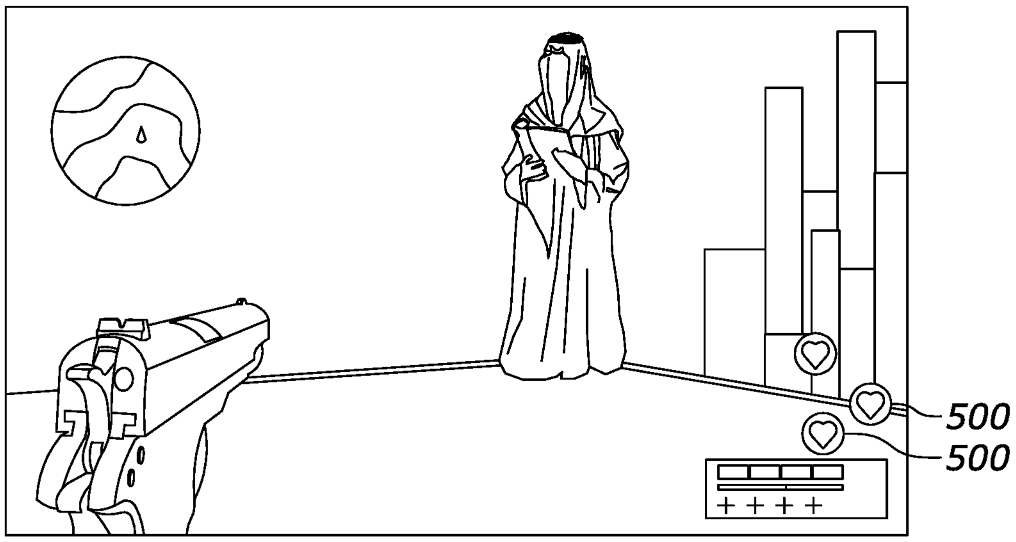
FIGS. 5 and 6 show examples consistent with present principles where a group of viewers provide different reactions that are surfaced to the streamer in different game contexts.
Figure 6:
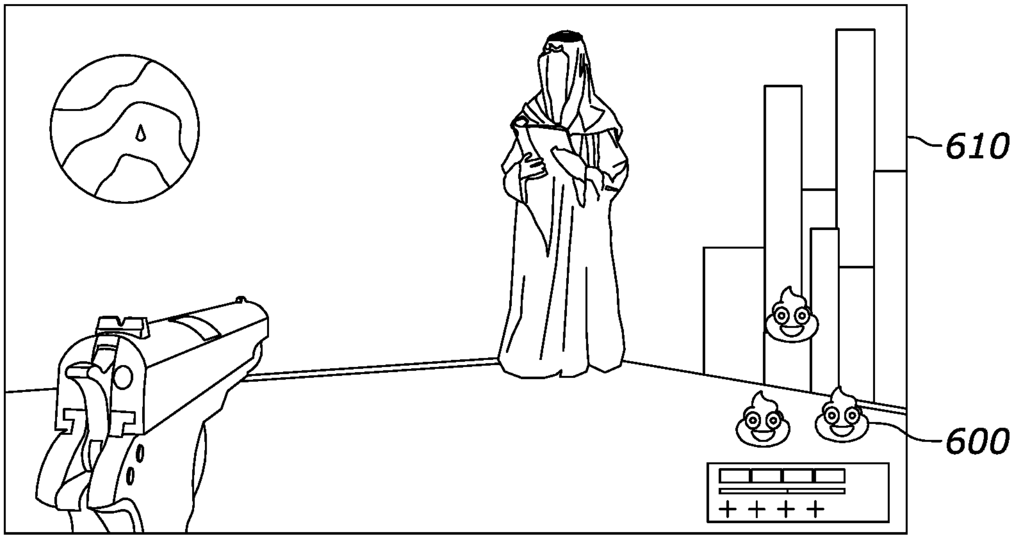

Turning now to FIGS. 5 and 6, these figures show examples involving different respective reactions from different viewers. Beginning first with FIG. 5, this figure demonstrates a situation in which a large party of viewers have gathered together to watch the gameplay of a remotely-located streamer (and possibly play the same game instance themselves). Owing to the large group, it might be difficult for the streamer to keep track of who is saying what in the audio chat of all the people speaking amongst each other in the game stream. Instead of trying to pay attention to that, the viewers can provide respective emoji reactions 500 with animated heart-shaped emotes to show their excitement and appreciation for a great move by the streamer in the game, doing so without causing confusion to the streamer. The streamer might then feel even better about the great move as the reactions 500 on screen amplify the gaming experience. Not only that, but the reactions 500 can trigger one or more power-ups for the streamer consistent with present principles, as described in greater detail below.

FIG. 6 then shows another reaction scenario where multiple viewers provide emotes and/or emojis to trigger not a power-up for the streamer but a power-down. Per FIG. 6, suppose a trolling scenario where two friends are playing a game together and the streamer (one of the players) is trying to build/complete a challenging structure. The viewer (the other player) might find it funny that the streamer cannot do so and may tease the streamer by adding a funny reaction every time the streamer is almost there. In the present instance, the reactions include excrement/poop emojis 600 that may be persistently presented on the streamer's screen 610 until the streamer successfully completes the task. Also, if a threshold number of separate inputs to provide the emojis 600 are received within a threshold period of time, the streamer might receive a power-down where, for example, the streamer loses inventory items or has a loss in virtual abilities for his/her character.

Figure 7:
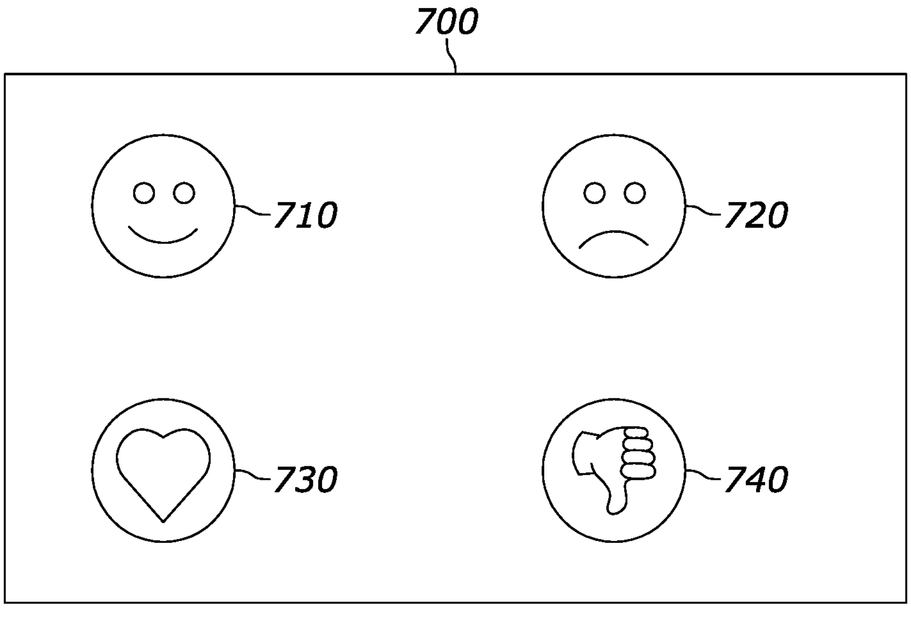
FIG. 7 shows an example GUI including a palette of different selectable reactions that may be used by viewers consistent with present principles.

Turning to FIG. 7, an example palette GUI700 is shown. The palette GUI700 may be presented on a viewer's screen while viewing the gameplay of a streamer/gamer. The palette GUI 700 may therefore be presented as part of the GUI 430 mentioned above, for example, but only on the viewer display and not on the streamer display. It may therefore be presented semi-transparently as an overlay on the game video stream itself, as an opaque inset on the game video, or opaquely off to one side of the video but still on the same display.

As shown in FIG. 7, the palette GUI 700 may include respective emojis and emotes that can be selected as input by the viewer to trigger power-ups and power-downs for a streamer consistent with present principles. As shown, a happy-face emoji 710 and a sad-face emoji 720 may be included on the palette GUI 700. The GUI 700 may also include a heart emoji 730 as well as a thumbs-down emoji 740. Other emojis of other types may also be presented, as well as emotes (such as avatars and other virtual characters making approving or disapproving faces) and other types of graphic-based sentiment reactions such as GIFs may also be presented as part of the GUI 700.

Figure 8:
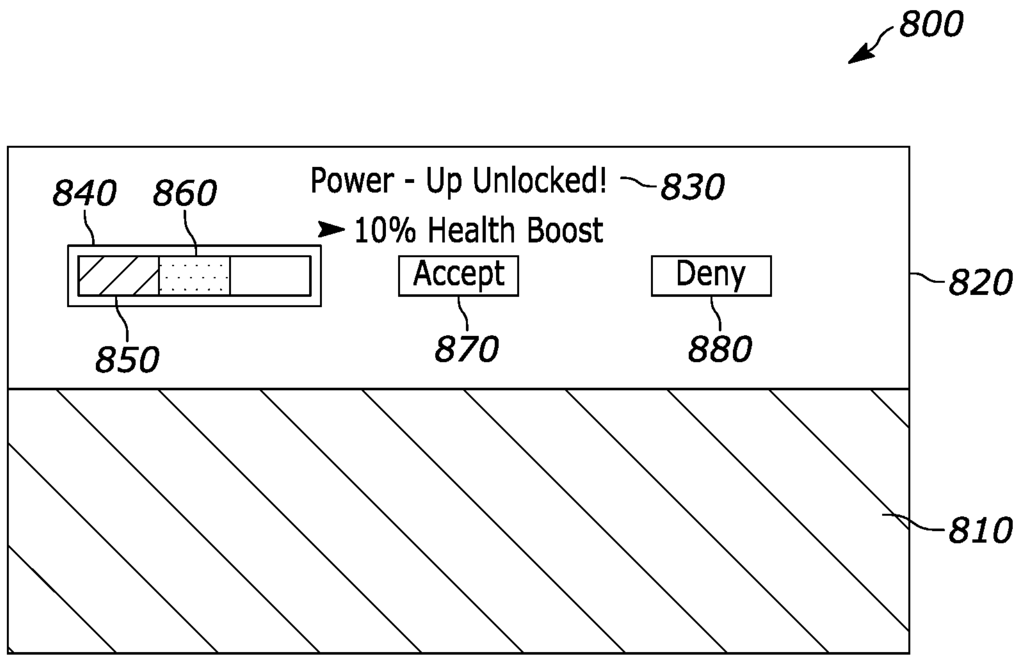
FIGS. 8-10 show example GUIs that may be presented on a streamer's display over top of game video responsive to a power-up or power-down being triggered, indicating the power-up or power-down itself and providing interactivity to the streamer consistent with present principles.

Moving to FIG. 8, suppose a streamer is playing a certain computer game and that a threshold number of approving emojis are received within a threshold period of time. In certain examples, it may be required that each received emoji used to meet the threshold number be from a different respective livestream viewer for more difficult-to-obtain power-ups or power-downs. However, in other examples, plural emojis from the same person may be used to meet the threshold number. Also note that whether an emoji or other graphic-based sentiment reaction is approving or disapproving may be indicated in metadata for the respective emoji, for example. Additionally, the threshold number may be required to be in relation to receipt of emojis all of the same particular type, or receiving approving (or disapproving) emojis of the threshold number more generally even if not all the same particular type (e.g., smiling-face emojis and heart emojis may both be approving emojis but of different types).

In terms of the threshold period of time mentioned in the paragraph immediately above, in various examples it may begin based on a game action performed by the streamer. The threshold time may then run for a set amount of time that is long enough to give viewers a chance to react, but short enough for the system to still infer that the inputs all relate to a same game action occurring immediately prior to reaction receipt (e.g., without any intervening events to which the viewers might also be reacting). As such, the threshold period of time may be ten or twelve seconds, for example. But in any case, it is noted more generally that the threshold period of time may be less than an entire amount of time to play a particular level or scene of the computer game. Thus, the threshold period of time may be a set period of time following conclusion of a boss battle or other fight event.

FIG. 8 therefore shows an example GUI 800 presentable on a streamer's screen. The GUI 800 may include the livestreamed game video 810 itself as well as a panel 820 indicating that a power-up has been provided or is available ("unlocked") for the streamer based on a threshold number of positive graphic-based sentiment reactions being received within a threshold period of time as set forth above. The panel 820 may therefore include a text indication 830 that the power-up has been unlocked, and may specify the particular type of power-up itself. In the present instance, the power-up is a ten percent boost in virtual character health for the virtual game character being played by the streamer.

The panel 820 may also include a graphic 840 that indicates a current health amount 850 prior to the power-up, as well as a health amount addition 860 resulting from the power-up. The health power-up of ten percent may be automatically applied to the streamer's character health in certain examples. In other examples, the streamer may first be required to accept the health power-up by selecting the accept selector 870. Or if the user is playing in a competition or otherwise does not want assistance from the viewers, the user may select the deny selector 880 to decline the power-up and keep his/her character's health at the current level prior to the power-up.

Figure 9:
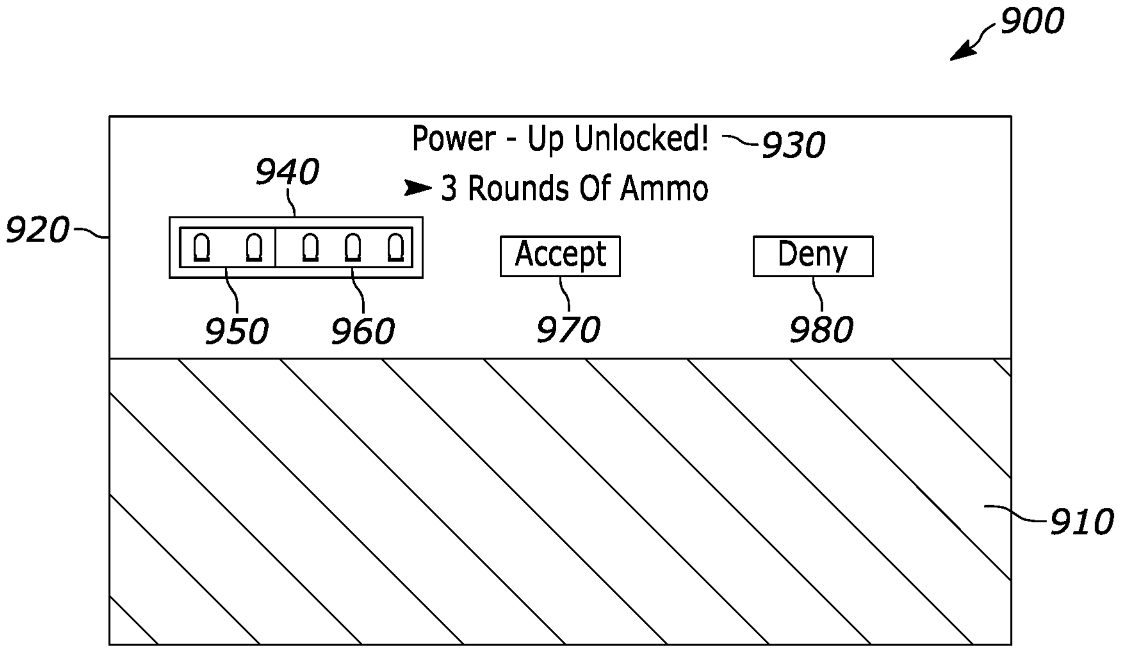

Turning to FIG. 9, another example power-up is illustrated via the example GUI 900 that is also presentable on a steamer's screen. The GUI 900 may therefore also include livestream game video 910 as well as a panel 920 indicating that a power-up has been provided or is available ("unlocked") for the streamer based on a threshold number of graphic-based positive sentiment reactions being received within a threshold period of time as set forth above. The panel 920 may therefore include a text indication 930 that the power-up has been unlocked, and may specify the particular type of power-up itself. In the present instance, the power-up is three extra rounds/bullets of ammo for the streamer's virtual character weapon inventory that may then be used for battling other game characters.

The panel 920 may also include a graphic 940 that indicates a current ammo inventory amount 950 prior to the power-up, as well as an ammo amount addition 960 resulting from the power-up. The ammo power-up may be automatically applied to the streamer's weapon inventory in certain examples. In other examples, the streamer may first be required to accept the ammo power-up by selecting the accept selector 970. Or if the user is playing in a competition or otherwise does not want assistance from the viewers, the user may select the deny selector 980 to decline the power-up and keep his/her character's weapon inventory at the current level prior to the power-up.

Figure 10:
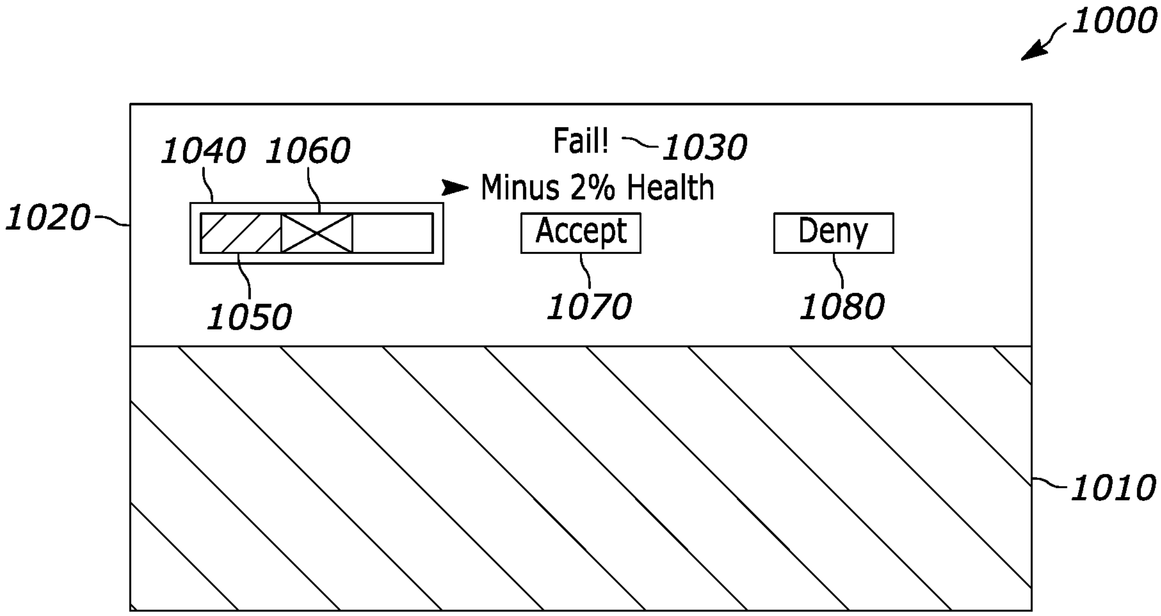

FIG. 10 shows yet another example, this time in terms of a power-down. Accordingly, a GUI 1000 is shown that may be presented on a streamer's screen based on a power-down resulting from receipt of negative sentiment emojis from viewers. The GUI 1000 may include livestream game video 1010, as well as a panel 1020 indicating that a power-down has been provided or is available for the streamer based on a threshold number of graphic-based negative sentiment reactions being received within a threshold period of time as set forth above. The panel 1020 may therefore include a text indication 1030 that the streamer has performed a game action that the viewers dislike ("Fail!"). The indication 1030 may also indicate that the power-down has been unlocked, and may specify the particular type of power-down itself. In the present instance, the power-down is a loss of two percent of character health for the streamer's game character.

The panel 1020 may also include a graphic 1040 that indicates a remaining health amount 1050 after the power-down of two percent is applied, as well as the two-percent health deduction amount 1060 itself resulting from the power-down. The two combined as part of the graphic 1040 also provide the streamer with a graphical indication of the overall character health prior to the power-down. The health power-down of two percent may be automatically applied to the streamer's character health in certain examples. In other examples, the streamer may first be required to accept the health power-down by selecting the accept selector 1070. Or if the user is playing in a competition or otherwise does not want power-downs instigated by the viewers, the user may select the deny selector 1080 to decline the power-down and keep his/her character's health at the current level prior to the power-down.

Figure 11:
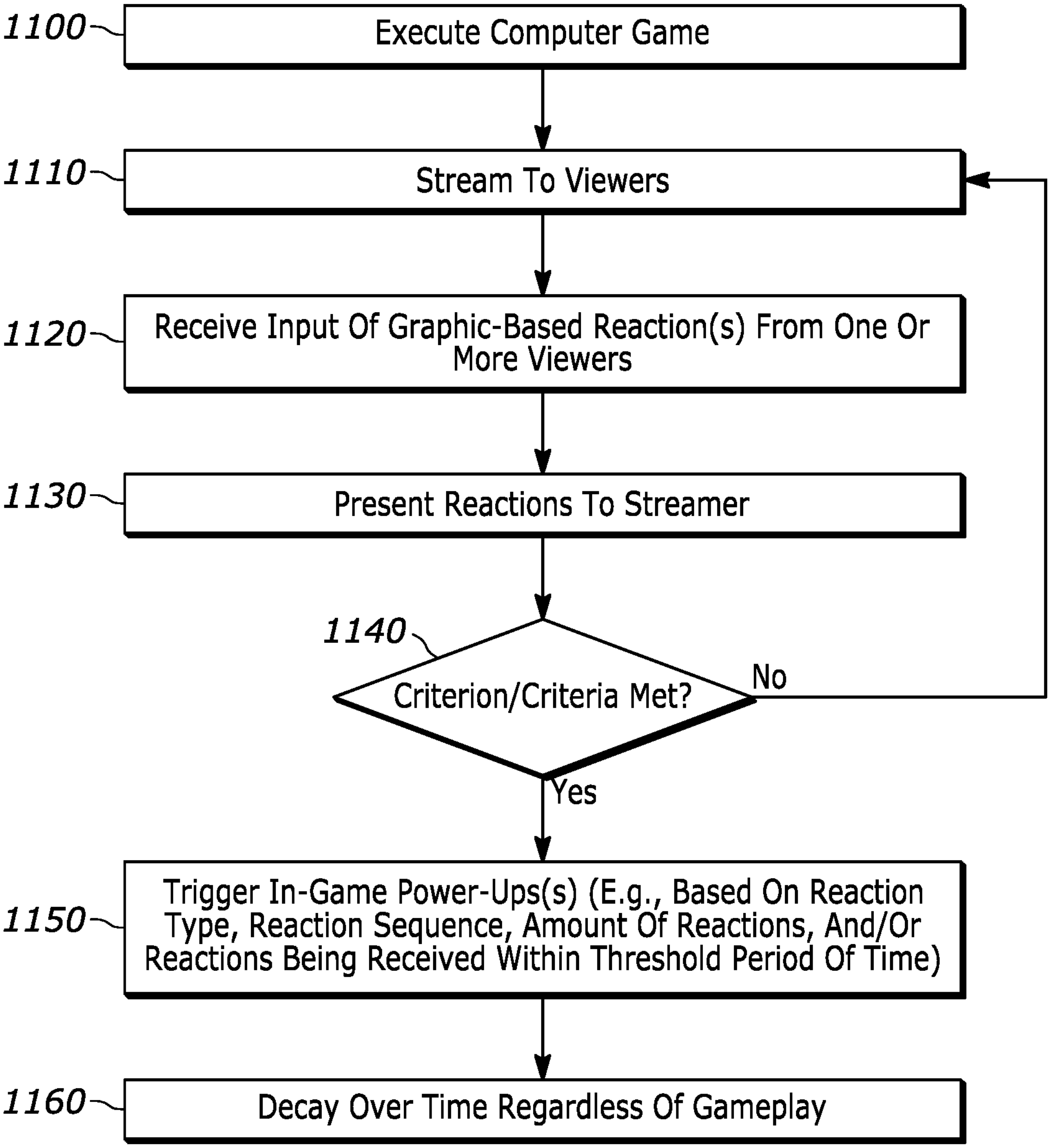
FIG. 11 shows example logic in example flow chart format that may be executed by a processor assembly consistent with present principles.

Referring now to FIG. 11, it shows example logic that may be executed by a system such as the system 10 and/or individual components thereof (e.g., a console or remotely-located server) consistent with present principles. Note that while the logic of FIG. 11 is shown in flow chart format, other suitable logic may also be used.

Beginning at block 1100, the system may execute a computer game in which a first person plays the computer game. The logic may then proceed to block 1110 where the system may stream the first person's gameplay to other viewers, e.g., over the Internet, a third-party streaming website, a dedicated console manufacturer's network, etc. Thereafter the logic may proceed to block 1120 where the system may receive inputs from viewers, including at least a second person that is viewing the livestream of the computer game but that is not controlling a character of the game. The input may include one or more graphic-based sentiment reactions as also discussed above (e.g., emojis, emotes, GIFs, etc.).

The logic of FIG. 11 may then proceed to block 1130 where the system may present, based on the input(s) received at block 1120, one or more corresponding graphic-based sentiment reaction outputs on a display associated with the first person. For example, the emojis of FIGS. 4-6 or any shown in the palette 700 of FIG. 7 may be presented on the streamer's display over top of the game video at block 1130.

From block 1130 the logic may then proceed to decision diamond 1140. At diamond 1140 the system may determine whether a single criterion or multiple criteria have been met for triggering an in-game power-up or in-game power-down. A negative determination at diamond 1140 may cause the logic to proceed to back to block 1110 to proceed again therefrom, while an affirmative determination may cause the logic to instead proceed to block 1150 to trigger the corresponding in-game power up or in-game power-down in response. Triggering may include automatically applying the power-up or power-down, or giving the streamer the option to first accept or decline the power-up or power-down before it is instituted as set forth above.

One example criterion may relate to reaction type. So, for example, based on the received graphic-based reaction(s) being reactions of a first reaction type, the system may trigger a first in-game power-up (or power-down) at block 1150. Based on the graphic-based reaction(s) being reactions of a second reaction type, the system may trigger a second, different in-game power-up (or power-down) at block 1150.

The second reaction type may be different from the first reaction type. For example, the first reaction type may be a particular type of emoji or emote, such as a smiling face emoji or laughter emoji. In other examples, the first reaction type may be a positive reaction more generally, where the positive reaction may relate to any number of positive emojis designated as such in metadata or other data accessible to the system. Likewise, the second reaction type may be a particular type of emoji or emote, such as frowning face emoji or anger emoji. But here too the second reaction type may also be a negative reaction more generally, where the negative reaction may relate to any number of emojis designated as such in metadata or other data accessible to the system. Any combination of the foregoing may also be used, for example the first reaction type may be a first particular positive emoji and the second reaction type may be a different particular positive emoji.

Also note that the resulting in-game power-ups (or power-downs) associated with each reaction type may be different from each other. So the power-ups may relate to different types of power-ups, such as smiling face emojis triggering ammo power-ups and laugher emojis triggering health power-ups. Or the power-ups (or power-downs) may be different but still of the same type. As an example here, the first power-up may be a character health boost of a first amount, and the second power-up may be a character health boost of a second amount greater than the first amount as triggered by a more intense positive reaction (e.g., laughter emojis being more intense than smiling emojis per emoji metadata or other sentiment classification).

Another example criterion may relate to the viewer reactions being received within a threshold period of time as set forth above. So based on the reaction inputs being received within a threshold period of time per this example, the system may trigger an in-game power-up (or power-down) at block 1150. Again note that the threshold period of time may begin based on a game action and may be less than an entire amount of time to play a particular level or scene of the computer game.

Additionally or alternatively, one of the criteria used at diamond 1140 may be whether a threshold number of inputs greater than one have been received to trigger the in-game power-up (or power-down) as described above. The threshold number may be ten or even one hundred, for example, depending on the difficulty that a game developer or console manufacturer may wish to institute for obtaining power-ups or power-downs.

As yet another example criterion, in addition to or in lieu of the foregoing the logic may determine at diamond 1140 whether a particular sequence of different reaction inputs have been received to trigger an in-game power up or down at block 1150. Thus, a first particular sequence of different reactions may trigger a first in-game power-up (or down), and a second, different particular sequence of different reactions may trigger a second, different in-game power-up (or down). The predetermined sequences may be set by a game developer or console manufacturer, for example.

Still further, the sequences may relate to escalating positive or negative reactions to trigger the resulting power-up or power-down at block 1150 in some particular examples. Escalating reactions may relate to the intensity of different reactions. Respective intensities may be stored in metadata or other data for each emoji, where for example a smiling emoji might be designated as having a lower positive intensity rank of one or two while a laughter emoji might have a higher positive intensity rank of five or six. Likewise, a frowning emoji may be designated as having a lower negative intensity rank of negative one or two, while an angry face emoji might have a higher negative intensity rank of eight or ten. In this way, the system may trigger in-game power-ups or power-downs as gameplay builds in a positive or negative fashion as indicated by the spectators, rather than the system triggering an in-game power-up or power-down for each and every type of emojis that are received that might have only elicited lower levels of sentiment from the spectators. This in turn may encourage the streamer to escalate his/her gameplay one way or the other to achieve viewer reaction escalation, not only enhancing the gameplay itself but also enhancing the viewing experience of the spectators/viewers.

Still in reference FIG. 11, note that from block 1150 the logic may then proceed to block 1160. At block 1160 the system may, in certain non-limiting examples, decay or otherwise reduce the power-up or power-down over time, regardless of gameplay from the streamer that might otherwise affect the level or amount of the parameter to which the power-up or power-down has been applied. In particular, this aspect may relate to power-ups or power-downs for grants of abilities such as fighting ability, jumping ability, running ability, etc. So the power-up or power-down may only be applied for a particular amount of time, and then the enhanced or reduced ability that was applied based on viewer sentiment reactions can be progressively and incrementally reduced or increased, respectively, over time back to the streamer character's ability level prior to applying the power-up or power-down. Or the enhanced or reduced ability may decay by simply reverting back to the previous ability instantly without a progressive reversion back to a previous level.

In terms of power-ups and power-downs themselves, they may relate not just to character health and character ability (e.g., offensive and defensive abilities as well as access abilities) as set forth above, but also to other types of metrics as well. For example, a power-up may add a life to the streamer's character, and a power-down may subtract a life from the streamer's character. Additionally, inventory power-ups and power-downs may relate not just to weapons inventories but to other types of inventories as well, such as character skin inventories, trick inventories, power inventories, points/coins inventories, and other asset inventories.

Figure 12:
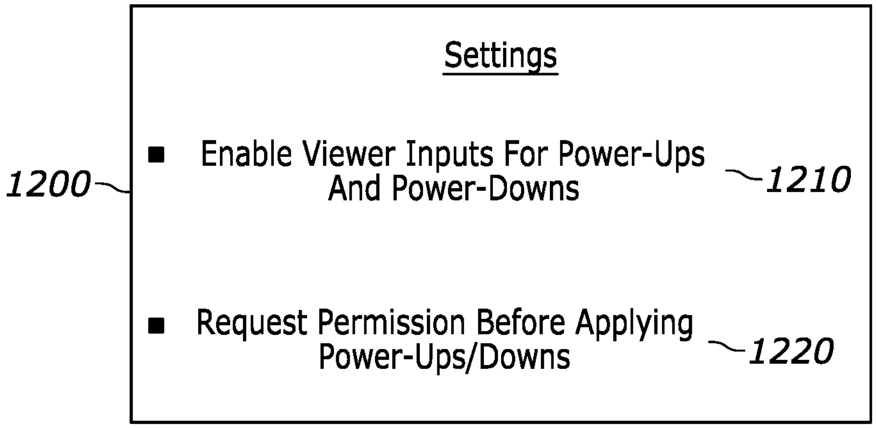
FIG. 12 shows an example settings GUI that may be presented on a display to configure one of more settings of a system/processor assembly to operate consistent with present principles.

Continuing the detailed description in reference to FIG. 12, it shows an example GUI 1200 that may be presented on the display of a gaming system to configure one or more settings of the system to undertake present principles. Each of the example options described below may be selected via touch input to the display if touch-enabled, cursor input (e.g., mouse or trackpad input), or other input directed to the associated check box per this example (and indeed any selectable items disclosed herein may be selected by these methods).

As shown in FIG. 12, the GUI 1200 may include a first option 1210 that may be selectable a single time to set/configure the system to, for multiple future games/game instances, execute the functions described above. Option 1210 may therefore be selected to enable viewer-based interaction with the streamer/gamer via graphic-based non-verbal reactions. So, for example, the logic of FIG. 11 may be executed for multiple future game instances based on the option 1210 being selected beforehand.

The GUI 1200 may also include an option 1220 that may be selected to set or configure the system to request permission from the streamer prior to applying any in-game power-ups or power-downs. This option may be selected if the streamer does not want the power-ups/downs automatically applied, for example.

It may now be appreciated that systems and methods for reaction chaining for power-ups and power-downs may be applied as a game mechanic to different types of games and gaming environments consistent with present principles. Viewers can thus send a series of specific reactions in quick succession to trigger temporary power-ups for the streamer. E.g., chaining heart reactions followed by star reactions might grant a health and damage boost.

Also note that non-graphic reactions to gameplay are also encompassed by present principles, including verbal reactions whether in text or audible form. So, for example, overall positive or negative sentiment, as well as particular reaction types, may be identified by executing natural language processing algorithms (such as sentiment analysis and/or natural language understanding) on written text reactions or audible reactions. The text or audible reactions might be provided by viewers as part of the bi-directional game stream itself. For audible reactions in particular, they may be analyzed for sentiment after the viewer's spoken words as detected by a local microphone have been converted to text using a speech-to-text algorithm.

While the particular embodiments are herein shown and described in detail, it is to be understood that the subject matter which is encompassed by the present invention is limited only by the claims.

What is claimed is:

1. An apparatus comprising:

a processor assembly programmed with instructions to:

execute a computer game that comprises a scene in which game actions associated with a character of the computer game are possible;

detect a game action of the game actions, wherein the game action has a start time;

receive, after the start time, input of a remote device at which a livestream of the computer game is viewed without controlling the character of the computer game, the input comprising a graphic-based reaction;

determine, based on the input, a sentiment type associated with the graphic-based reaction;

cause a presentation of information regarding a modification to the character in the scene based on the sentiment type, wherein the information comprises a textual description indicating availability of the modification and a selector associated with execution of the modification, and wherein the selector comprises a first option to accept the modification and a second option to decline the modification;

receive selection of the first option; and trigger, responsive to selection of the first option, the modification to the character in the scene.

2. The apparatus of claim 1, wherein the graphic-based reaction is selected from a palette of reaction options of a graphical user interface (GUI) of the remote device, and wherein the palette of reaction options comprise: a positive sentiment graphic-based reaction and a negative sentiment graphic-based reaction.

3. The apparatus of claim 1, wherein the graphic-based reaction comprises one or more of: an emoji, an emote.

4. The apparatus of claim 1, wherein the processor assembly is configured to:

based on the graphic-based reaction comprising a first sentiment type, trigger a first modification to the character in the scene; and based on the graphic-based reaction comprising a second sentiment type, trigger a second modification to the character in the scene, the second sentiment type being different from the first sentiment type and the second modification being different from the first modification.

5. The apparatus of claim 1, wherein the processor assembly is configured to:

receive respective inputs from different people that are viewing the livestream, the respective inputs each comprising a graphic-based reaction; and based on the respective inputs being received within a threshold period of time, trigger the modification.

6. The apparatus of claim 5, wherein the threshold period of time begins based on the start time and is less than an entire amount of time to play a particular level of the computer game or the scene.

7. The apparatus of claim 1, wherein the processor assembly is configured to:

receive plural inputs each of which comprises a graphic-based reaction; and based on the plural inputs being received within a threshold period of time, trigger the modification.

8. The apparatus of claim 1, wherein the processor assembly is configured to:

receive plural inputs each of which comprises a graphic-based reaction; and based on the plural inputs establishing a threshold number of inputs greater than one, trigger the modification.

9. The apparatus of claim 1, wherein the processor assembly is configured to:

receive a particular sequence of inputs of graphic-based reactions having different sentiment types; and based on the particular sequence of inputs, trigger the modification.

10. The apparatus of claim 9, wherein the particular sequence of inputs is a first particular sequence, wherein the modification is a first modification, and wherein the processor assembly is configured to:

receive a second particular sequence of inputs of different graphic-based reactions, the second particular sequence being different from the first particular sequence; and based on the second particular sequence, trigger a second modification different from the first modification.

11. The apparatus of claim 1, wherein the modification incrementally decays over time regardless of gameplay.

12. The apparatus of claim 1, wherein the modification comprises a character health power-up or a character ability power-up.

13. The apparatus of claim 1, wherein the modification comprises an added character life.

14. The apparatus of claim 1, wherein the modification comprises a player inventory power-up.

15. A method, comprising:

executing a computer game that comprises a scene in which game actions associated with a character of the computer game are possible;

detecting a game action of the game actions, wherein the game action has a start time;

receiving, after the start time, input of a remote device at which a livestream of the computer game is viewed, the input comprising a graphic-based reaction;

determining, based on the input, a sentiment type associated with the graphic-based reaction;

causing a presentation of information regarding a modification to the character in the scene based on the sentiment type, wherein the information comprises a textual description indicating availability of the modification and a selector associated with execution of the modification, and wherein the selector comprises a first option to accept the modification and a second option to decline the modification;

receiving selection of the first option; and triggering, responsive to selection of the first option, the modification to the character in the scene.

16. The method of claim 15, comprising:

based on the graphic-based reaction comprising a first sentiment type, triggering a first modification to the character in the scene; and based on the graphic-based reaction comprising a second sentiment type, triggering a second modification to the character in the scene, the second sentiment type being different from the first sentiment type, the second modification being different from the first modification.

17. The method of claim 15, comprising:

receiving plural inputs each of which comprises a graphic-based reaction; and based on the plural inputs being received within a threshold period of time, triggering the modification.

18. The method of claim 15, comprising:

receiving a particular sequence of inputs of different graphic-based reactions; and based on the particular sequence of inputs, triggering the modification.

19. A system comprising:

at least one computer storage that is not a transitory signal and that comprises instructions executable by at least one processor to:

execute a computer game that comprises a scene in which game actions associated with a character of the computer game are possible;

detect a game action of the game actions, wherein the game action has a start time;

receive, after the start time, input from a remote device at which a livestream of the computer game is viewed, the input comprising a graphic-based reaction;

determine, based on the input, a sentiment type associated with the graphic-based reaction;

cause a presentation of information regarding a modification to the character in the scene based on the sentiment type, wherein the information comprises a textual description indicating availability of the modification and a selector associated with execution of the modification, and wherein the selector comprises a first option to accept the modification and a second option to decline the modification;

receive selection of the first option; and trigger, responsive to selection of the first option, the modification to the character in the scene.

* * * * *